(12) United States Patent
Johnson

(10) Patent No.: US 7,314,347 B2
(45) Date of Patent: *Jan. 1, 2008

(54) PRESSURIZED FLUID BLADELESS TURBINE ENGINE WITH OPPOSING FLUID INTAKE ASSEMBLIES

(75) Inventor: Neldon P. Johnson, Salem, UT (US)

(73) Assignee: N.P. Johnson Family Limited Partnership, Salem, UT (US)

(*) Notice: Subject to any disclaimer, the term of this patent is extended or adjusted under 35 U.S.C. 154(b) by 224 days.

This patent is subject to a terminal disclaimer.

(21) Appl. No.: 10/962,051

(22) Filed: Oct. 7, 2004

(65) Prior Publication Data

US 2005/0249582 A1    Nov. 10, 2005

(51) Int. Cl.
*F03B 3/00* (2006.01)

(52) U.S. Cl. .................. 415/80; 415/104; 415/115

(58) Field of Classification Search ............. 415/80, 415/90, 115, 104, 202; 60/39.34, 39.35
See application file for complete search history.

(56) References Cited

U.S. PATENT DOCUMENTS

| | | | | |
|---|---|---|---|---|
| 824,113 A | 6/1906 | Groshon | ................. | 415/82 |
| 851,886 A * | 4/1907 | Hoover | ............... | 415/52.1 |
| 890,392 A | 6/1908 | Adams | ................. | 415/80 |
| 1,110,302 A | 9/1914 | Flatau | ................. | 415/80 |
| 2,569,997 A | 10/1951 | Kollsman | ............. | 415/80 |
| 3,026,088 A | 3/1962 | Green | ................. | 415/80 |
| 3,999,377 A * | 12/1976 | Oklejas et al. | ........ | 60/39.511 |
| 4,087,974 A | 5/1978 | Vaughan | .............. | 60/618 |
| 4,100,765 A | 7/1978 | Kantor | ................ | 62/499 |
| 4,201,058 A | 5/1980 | Vaughan | .............. | 60/618 |
| 4,302,683 A | 11/1981 | Burton | ................ | 290/4 |
| 4,332,520 A | 6/1982 | House | ................. | 415/63 |
| 4,354,801 A | 10/1982 | LaBaire | .............. | 415/80 |
| 4,406,127 A | 9/1983 | Dunn | ................. | 60/618 |
| 4,430,042 A | 2/1984 | House | ................. | 415/1 |
| 4,433,548 A | 2/1984 | Hallstrom, Jr. | ........ | 60/712 |
| 4,448,024 A | 5/1984 | Molini et al. | ......... | 60/649 |
| 4,590,766 A | 5/1986 | Striebich | ............. | 60/618 |
| 4,785,631 A | 11/1988 | Striebich | ............. | 60/618 |
| 4,883,404 A | 11/1989 | Sherman | .............. | 415/115 |
| 4,969,796 A | 11/1990 | Wescott et al. | ........ | 415/110 |
| 4,996,845 A | 3/1991 | Kim | ................... | 60/618 |
| 5,000,003 A | 3/1991 | Wicks | ................. | 60/618 |
| 5,176,000 A | 1/1993 | Dauksis | .............. | 60/618 |
| 5,219,270 A | 6/1993 | Titmas | ................ | 415/80 |
| 5,236,349 A | 8/1993 | Fabris | ................. | 415/80 |
| 5,271,225 A | 12/1993 | Adamides | ............. | 60/416 |
| 5,525,034 A | 6/1996 | Hays | .................. | 415/80 |
| 6,997,674 B1 * | 2/2006 | Johnson | ............... | 415/80 |

\* cited by examiner

*Primary Examiner*—Ninh H. Nguyen
(74) *Attorney, Agent, or Firm*—J. David Nelson

(57) ABSTRACT

A bladeless pressurized fluid turbine engine having a bladeless turbine, internal, concentric or circumferential shaft fluid ways which transmit pressurized gas to the turbine, and a pair of opposing pressurized fluid intake assemblies. Each intake assembly has a fixed outer housing, two or more shaft seals sealing between the shaft and the outer housing forming fluid supply chambers between adjacent shaft seals, and a pair of shaft bearings bearing between the shaft and the outer housing. The outer housing has one or more fluid intake ports for each fluid supply chamber and each shaft fluid way has a shaft fluid intake which is hydraulically connected to a fluid supply chamber.

48 Claims, 9 Drawing Sheets

US 7,314,347 B2

PRESSURIZED FLUID BLADELESS TURBINE ENGINE WITH OPPOSING FLUID INTAKE ASSEMBLIES

RELATED APPLICATIONS

This application is related to the prior filed and pending U.S. patent application, application Ser. No. 10/839,697 filed by the applicant.

FIELD OF THE INVENTION

This invention is in the field of turbine engines and in particular in the field of pressurized fluid driven bladeless turbine engines.

BACKGROUND OF THE INVENTION

The conventional design for the turbines used in turbine engines incorporates small fins on the turbine. In order for the turbine engine to be efficient, extremely close tolerances are required between the turbine seat of the expansion chamber and the turbine fins. Also, the expansion chamber and the turbine, including the fins, must be able to withstand high temperatures. Because the turbine seat and the fins must be machined to a very close tolerance and must be able to withstand high temperature, they must be constructed of highly durable material. Otherwise, high efficiency will not be achieved and wear will be excessive, rapidly diminishing the efficiency of the engine.

The pressurized gas turbine engine disclosed in U.S. Pat. No. 6,533,539 to Johnson, the inventor of the present invention, is a bladeless turbine with peripheral nozzles. One of the advantages of a bladeless turbine is that it may also be utilized with pressurized liquid sources such as hot water from a geothermal well or a solar collector, with the pressurized liquid being passed directly to the nozzles where the liquid is flashed to gas as the liquid is passed through the nozzles. Conventional geothermal generator facilities require the flashing of hot water extracted from a geothermal well to steam, and the steam is then passed to the turbine. This results in a substantial loss of energy from the water in converting it to steam. The direct flashing of the hot water in the nozzles of a bladeless turbine increases the efficiency substantially.

A bladeless turbine engine requires that the pressurized fluid that is used to power the engine must be supplied to the center of the turbine by one or more fluid conduits. That requires that the pressurized fluid be conveyed in one or more fluid passageways that are contained in or attached to the shaft. The obvious difficulty in supplying pressurized fluid to a bladeless turbine shaft arises from the fact that the shaft rotates as the fluid is input. Further, input of the pressurized fluid must be accomplished with the shaft rotating while preventing pressurized fluid leakage.

U.S. Pat. No. 890,392 to Adams, U.S. Pat. No. 824,113 to Groshon, U.S. Pat. No. 1,110,302 to Flatau, U.S. Pat. No. 2,569,997 to Kollsman, U.S. Pat. No. 4,302,683 to Burton, U.S. Pat. No. 5,219,270 to Titmas, and U.S. Pat. No. 5,525,034 to Hays each disclose a bladeless turbine engine. These patents disclose means for inputting steam or other pressurized fluid to the turbine while sealing the turbine against pressurized fluid leakage and disclose bearing means for rotation of the turbine.

The prior related application identified above by the present inventor discloses a pressurized fluid turbine engine with a pressurized fluid intake assembly that supplies pressurized fluid to bladeless turbine shaft fluid ways from one or more pressurized fluid sources while permitting power takeoff from either end of the turbine shaft. The prior related application also discloses embodiments of the turbine engine with means for reducing the thrust imposed on shaft bearings.

An objective of the present invention is to provide a pressurized fluid bladeless turbine engine having a pair of opposing pressurized fluid intake assemblies which provide for lateral intake of pressurized fluid from one or more sources of pressurized fluid to the turbine shaft.

An objective of the present invention is to provide a pressurized fluid bladeless turbine engine having a pair of opposing pressurized fluid intake assemblies which provide for balancing or reducing the thrust imposed on the shaft bearings and shaft seals.

A further objective of the present invention is to provide a pressurized fluid bladeless turbine engine having a shaft and an intake assembly which provides for power takeoff from the shaft on either or both sides of the turbine.

A further objective of the present invention is to provide a pressurized fluid bladeless turbine engine having a shaft and an intake assembly which provide for reduced leakage and enhanced durability of the seals.

A further objective of the present invention is to provide a pressurized fluid bladeless turbine engine which is economical and reliable.

A further objective of the present invention is to provide a high efficiency pressurized fluid bladeless turbine engine for which the need for close tolerance machining and the need for high cost parts and materials are reduced.

A further objective of the present invention is to provide a pressurized fluid bladeless turbine engine that provides for the use of compressible and non-compressible fluids and provides for the direct flashing of pressurized fluids in the fluid nozzles which power the turbine.

SUMMARY OF THE INVENTION

The pressurized fluid bladeless turbine engine of the present invention has a pair of opposing intake assemblies which are positioned on opposing sides of the turbine. Each intake assembly incorporates a shaft with an internal shaft fluid way or one or more peripheral shaft fluid ways. The peripheral shaft ways may be concentric shaft fluid ways affixed to a shaft core or longitudinal, segmental shaft fluid ways in a circumferential conduit which is affixed to a shaft core. Lateral fluid intakes provide for pressurized fluid to be fed to the shaft fluid ways from one or more pressurized fluid sources. Each pressurized fluid intake assembly allows for the lateral intake of pressurized fluid to the shaft while not interfering with power take off from the shaft. Power take off-can occur on either side of the turbine. Each pressurized fluid intake assembly includes shaft seals which minimize pressurized fluid leakage and shaft bearings which provide for the free rotation of the shaft and the turbine. The shaft, intake, seal and bearing components and configuration of the present invention provide for low cost fabrication. Low tolerance machining and high cost materials are minimized for this engine.

One preferred embodiment of the present invention has one internal shaft fluid way. This embodiment of the turbine engine has a shaft which has a hollow core which is the shaft fluid way for this preferred embodiment. This embodiment can be provided with a front power take off or a rear power take off or both. For each intake assembly, a front bearing and a rear bearing provide for the free rotation of the shaft within an outer housing. The bearings are affixed to the outer housing and a thrust collar provides for pre-loading the bearings so as to counter the axial thrust imposed on the bearings by normal operation of the turbine engine.

The bladeless turbine has two or more nozzle arms affixed to the shaft and the shaft fluid way is hydraulically connected to each nozzle by nozzle fluid ways. Shaft flash chambers and nozzle flash chambers provide for flashing control for a liquid pressurized drive fluid, to minimize undesirable flashing. A fluid supply line, which supplies the pressurized drive fluid, is affixed to the outer housing and hydraulically connected to the outer housing of each intake assembly by a outer housing fluid intake. A front shaft seal and a rear shaft seal allow the rotation of the shaft in the inner housing of each intake assembly while preventing leakage of the drive fluid along the shaft. This embodiment of the turbine engine of the present invention is adaptable to known and readily available shaft seals. Embodiments having an internal shaft fluid way will accommodate pressurized fluid from multiple gas sources, all of which can be input by a pipe affixed to fluid intakes in the outer housing. However, these embodiments do not provide for respective pairs or sets of nozzles to utilize pressurized fluid from different gas sources.

Embodiments having two or more peripheral, concentric shaft fluid ways provide for conveying the drive fluid independently to pairs or sets of nozzle arms. An inner shaft fluid way is affixed to the shaft core. Additional shaft fluid ways are affixed concentrically to the shaft. Each nozzle fluid way is hydraulically connected to a concentric shaft fluid way. The concentric shaft fluid ways make it possible to utilize a solid shaft core, thereby increasing the strength and durability of the shaft. This embodiment also provides for power take off from a front power take off or a rear power take off, or both.

Fluid supply lines are attached to an outer housing. Drive fluid is supplied through the fluid supply lines to supply chambers formed between the outer housing inner surface and shaft fluid way outer surfaces. The shaft fluid ways are hydraulically connected to a supply chamber. The shaft fluid ways are also hydraulically connected to one or more nozzle fluid ways in a nozzle arm thereby providing for pressurized gas to be conveyed to the turbine nozzles.

The outer housing of each intake assembly is a fixed shell which is preferably cylindrical in shape and concentric with the shaft. A front bearing which bears on the outer shaft fluid way outer surface and the outer housing inner surface and a rear bearing which bears on the shaft core outer surface and the rear bearing bushing, provide for the free rotation of the shaft core, the concentric shaft fluid ways which are affixed to the shaft core, and the turbine. The number of concentric shaft fluid ways can be varied.

Shaft seals are required for each intake assembly, the number depending on the number of fluid supply chambers required, to minimize leakage of the drive fluid from the supply chambers. Embodiments providing for the independent input of additional fluid sources merely require additional concentric shaft fluid ways and additional fluid supply chambers separated by a respective inner seal. Also, depending upon the length and other physical characteristics of the shaft, multiple shaft fluid way embodiments may require additional inner bearings. A plurality of pressurized fluid supply lines and a plurality of pressurized fluid sources can be connected to any or all of the fluid supply chambers.

For other preferred embodiments, pressurized fluid enters the concentric shaft fluid way by one or more fluid way ports in the inner fluid shell. Shaft fluid way thrust plugs in the concentric shaft fluid ways provide for a reduction in the net thrust imposed on the front bearing and the rear bearing. This also requires the addition of one or more additional seals and a different positioning and sizing for the rear seal.

Other preferred embodiments may incorporate a circumferential conduit which is attached to a shaft core. The circumferential conduit is divided into two or more contiguous, longitudinal, segmental shaft fluid ways which intake pressurized fluid from the respective pressurized fluid sources through fluid way intakes which are isolated in respective circumferential supply chambers by respective shaft seals. A front shaft bearing and a rear shaft bearing bear between the outer housing and the circumferential conduit providing for the free rotation of the shaft in the outer housing. The circumferential conduit and the shaft fluid ways extend rearward from the rear shaft bearing and the outer housing rear wall. Thrust plugs in each of the shaft fluid ways provide for reducing the thrust imposed on the bearings.

It should be noted that each of the embodiments of the present invention can be used for compressible and non-compressible fluids, including, for example, pressurized hot water and pressurized steam.

For the preferred embodiments and any variations thereof, any support structure for the turbine engine can be affixed to the outer housing. The entire turbine engine of these embodiments can be enclosed in a turbine engine body for fluid capture and recycle and for waste heat capture and recycle. Alternatively, the turbine can be enclosed in a turbine engine body with the turbine shaft extending through one wall of the turbine engine body, thereby allowing for fluid and waste heat capture and recycle.

DETAILED DESCRIPTION

Figure 1:
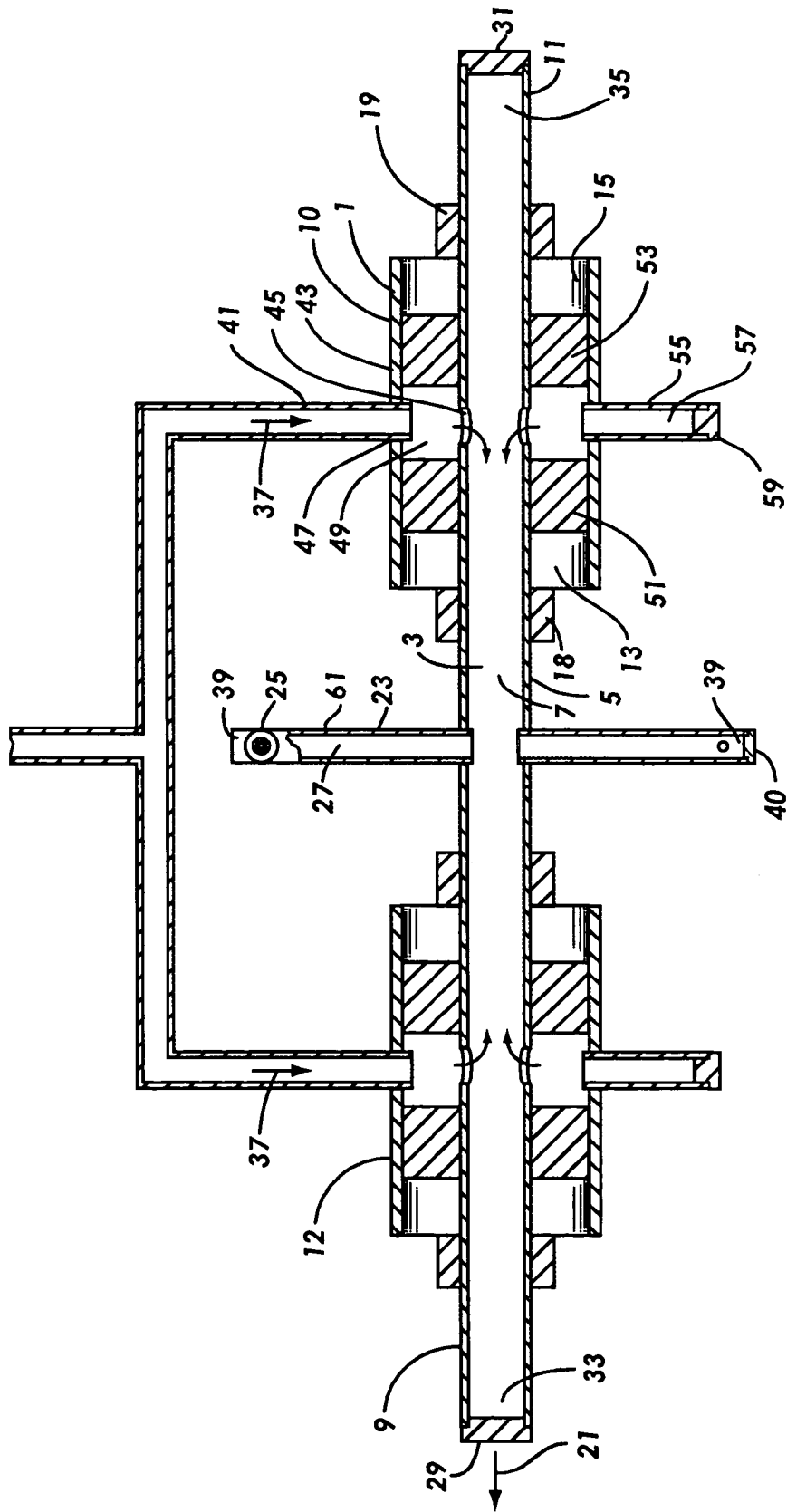
FIG. 1 is a horizontal cross section of a preferred embodiment of a bladeless turbine engine of the present invention with an internal shaft fluid way and opposing intake assemblies having one fluid supply chamber and one fluid supply line.

Referring first to FIG. 1, a top view horizontal cross-section of a preferred embodiment of the pressurized fluid turbine engine 1 of the present invention with one internal shaft fluid way 3 is shown. This embodiment of the turbine engine has a turbine shaft 5 which has a hollow core 7 which is the shaft fluid way for this preferred embodiment. This embodiment can be provided with a front power take off 9 or a rear power take off 11 or both as shown in FIG. 1. A first intake assembly 10 includes a front bearing 13 and a rear bearing 15 to provide for the free rotation of the shaft within an outer housing 43. The bearings are affixed to the outer housing and a front thrust collar 18 and a thrust nut 19 maintain the positioning of the turbine and the bearings and the thrust nut provides for pre-loading the bearings so as to counter the axial thrust 21 imposed on the bearings by normal operation of the turbine engine.

The bladeless turbine 23 has two or more nozzle arms 61, which for the embodiment shown are nozzle support tubes, affixed to the shaft 5 and the shaft fluid way 3 is hydraulically connected to each nozzle 25 by nozzle fluid ways 27. A front plug 29 and a rear plug 31 provide for access to the shaft fluid way. A front flash chamber 33 and a rear flash chamber 35 provide for flashing control for a liquid pressurized drive fluid 37 such as heated water, to minimize undesirable flashing as the pressurized liquid enters the nozzle fluid ways, which interferes with the operation of the turbine and reduces its efficiency. Similarly, nozzle flash chambers 39 minimize undesirable flashing in the nozzle fluid ways as the pressurized liquid passes to the nozzles 25. A nozzle way plug 40 provides for access to the nozzle fluid way.

A fluid supply line 41, which supplies the pressurized drive fluid 37 to the first intake assembly 10, is affixed to the outer housing 43 and hydraulically connected to the outer housing by a outer fluid intake port 47. The drive fluid flows from the supply line 41 into the supply chamber 49 of the intake assembly which is enclosed by the outer housing, to one or more shaft fluid intakes 45 in the shaft fluid way 3. The first intake assembly includes a front shaft seal 51 and a rear shaft seal 53 which allow the rotation of the shaft 5 in the intake assembly while preventing leakage of the drive fluid along the shaft. This embodiment of the turbine engine of the present invention is adaptable to known and readily available shaft seals. The outer housing can be adapted by bushings or seats to accommodate a variety of commercially available seals.

A supply flash line 55 extending from the opposite side of the outer housing from the fluid supply line has a intake flash chamber 57 which provides for minimizing flashing as a liquid drive fluid enters the shaft fluid way. An intake plug 59 at the end of the supply flash line provides for access to the supply line.

A second intake assembly 12, which for the preferred embodiment shown in FIG. 1 mirrors the first intake assembly, provides for the feed of pressurized drive fluid 37 from the supply line 41 to the shaft fluid way at the same or approximately the same pressure as that fed by the first intake assembly. This eliminates or greatly reduces the net axial thrust on the shaft bearings by balancing the axial thrust 21 imposed on the shaft bearings of each intake assembly by the pressurized fluid fed to each intake assembly.

The embodiment shown in FIG. 1 will accommodate pressurized fluid from multiple gas sources, all of which can be input by a pipe affixed to fluid intakes in the outer shell. However, the embodiment of FIG. 1 does not provide for respective pairs or sets of nozzles to utilize pressurized fluid from different gas sources.

Figure 2:
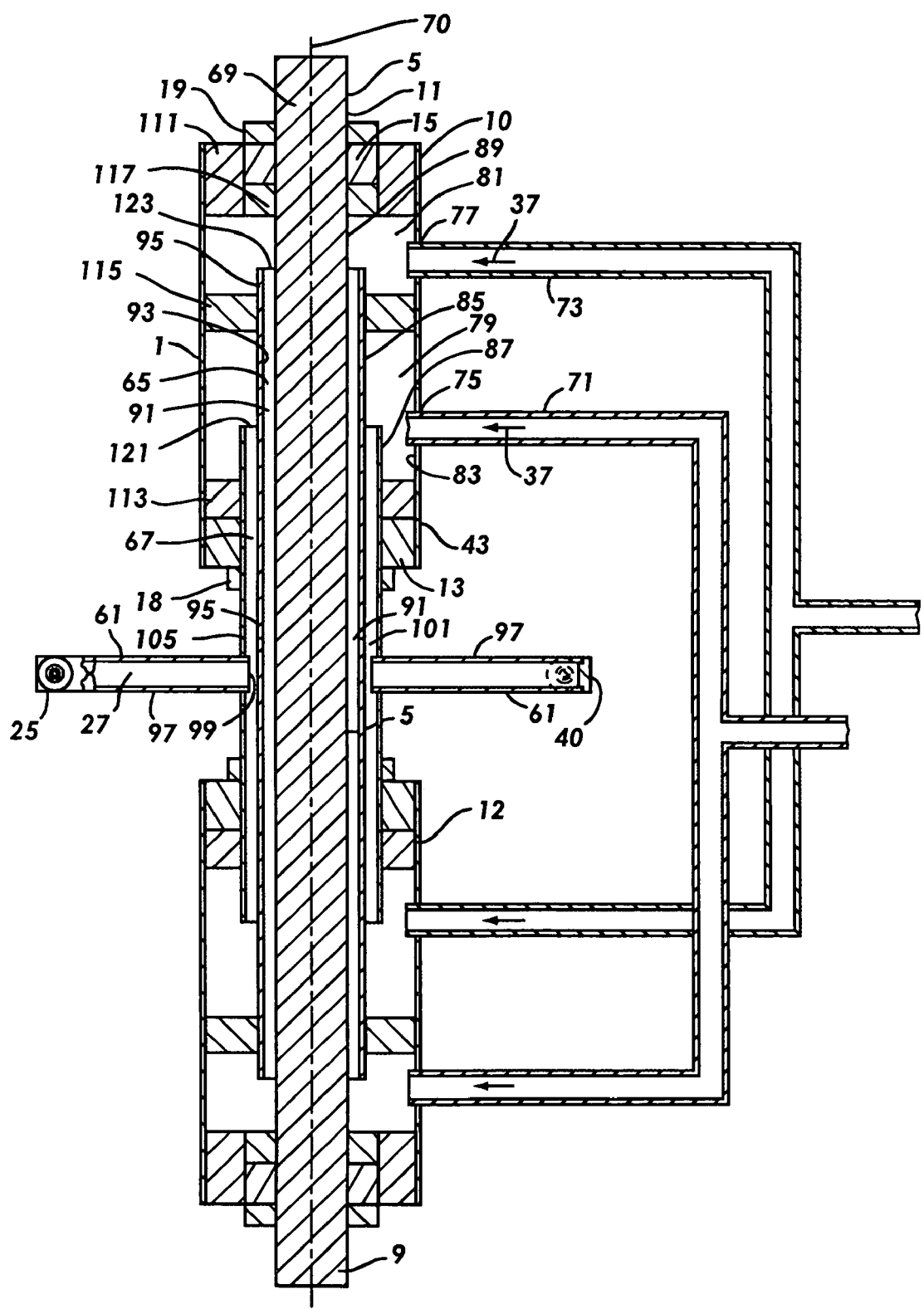
FIG. 2 is a horizontal cross section of a preferred embodiment of a bladeless turbine engine of the present invention with two peripheral, concentric shaft fluid ways and opposing intake assemblies having two fluid supply chambers and two fluid supply lines.

Referring now to FIG. 2 a top view of a horizontal cross section of a preferred embodiment of the turbine engine land a first intake assembly 10 of the present invention providing for two gas sources to be routed independently to pairs or sets of nozzles is shown. For the embodiment shown, two peripheral, concentric shaft fluid ways, an inner shaft fluid way 65 and an outer shaft fluid way 67, provide for conveying the drive fluid 37 to the nozzle arms 61. The concentric shaft fluid ways make it possible to utilize a solid shaft core 69, thereby increasing the strength and durability of the shaft. The inner shaft fluid way is affixed to the shaft core. The outer shaft fluid way is affixed to the inner shaft fluid way. The shaft fluid ways are concentric with the shaft core, having a common shaft axis 70. Each nozzle fluid way 27 is hydraulically connected to a concentric shaft fluid way. This embodiment also provides for power take off from a front power take off 9 or a rear power take off 11.

A first fluid supply line 71 is attached to a first fluid intake port 75 in the outer housing 43 and a second fluid supply line 73 is attached to a second fluid intake port 77 in the outer housing. Drive fluid 37 is supplied through the first fluid supply line to a first supply chamber 79 formed between the outer housing inner surface 83 and the outer shaft fluid way outer surface 87 and the inner shaft fluid way outer surface 85 respectively. Similarly, drive fluid is supplied through the second fluid supply line to a second supply chamber 81 formed between the outer housing inner surface and the inner shaft fluid way outer surface and the shaft core outer surface 89 respectively.

Figure 3:
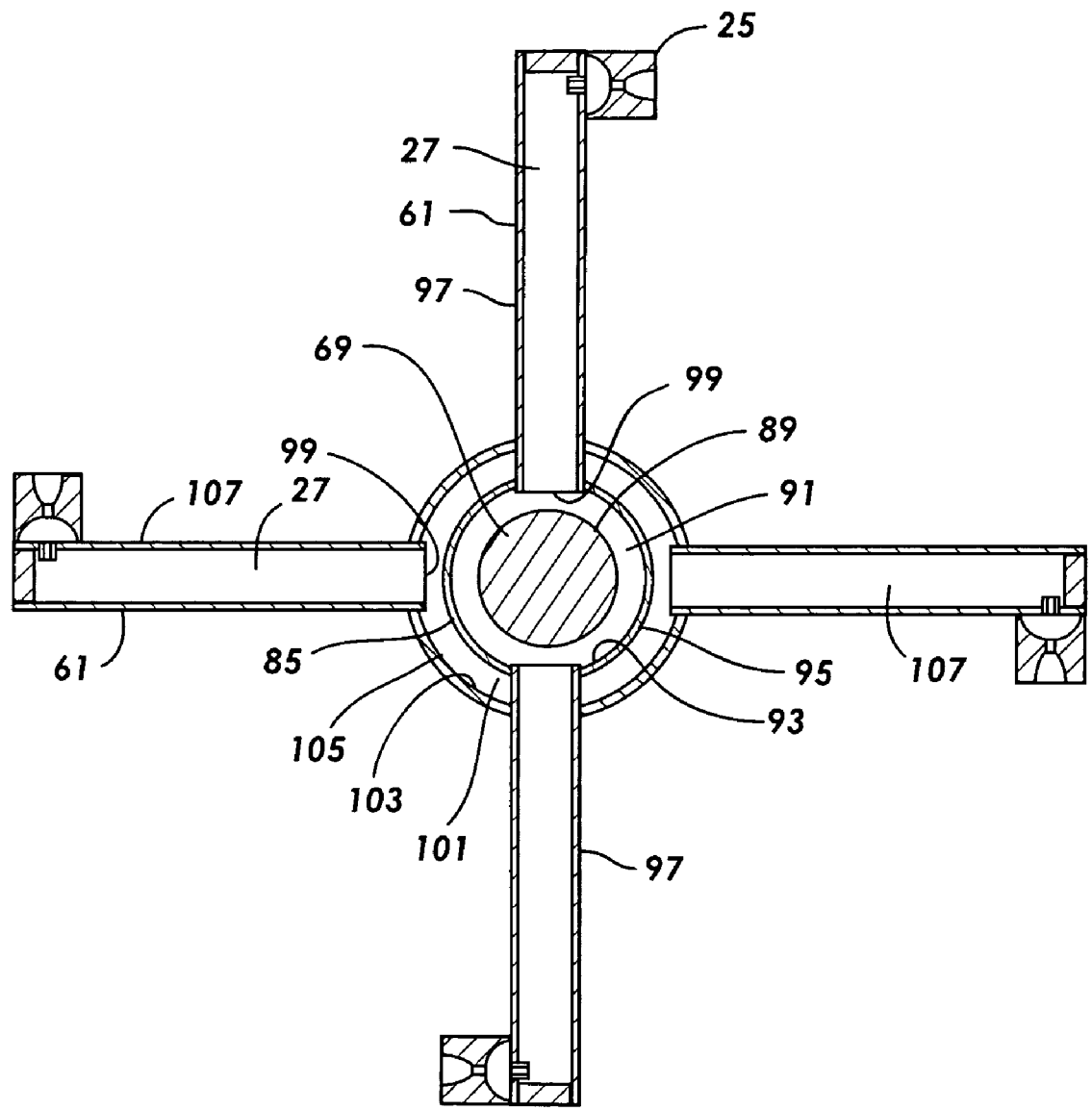
FIG. 3 is a vertical cross section of a preferred embodiment of a bladeless turbine engine of the present invention with two peripheral, concentric shaft fluid ways.

Referring to FIG. 2 and to FIG. 3, the inner shaft fluid way has an inner annular space 91, which is formed between the interior surface 93 of the inner fluid shell 95 and the shaft core outer surface 89, which is hydraulically connected to one or more nozzle fluid ways 27 in a nozzle arm 61 thereby providing for pressurized gas to be conveyed to the turbine nozzles 25. Nozzle arms 97 with nozzle fluid ways supplied by the inner shaft fluid way are affixed to the inner fluid shell 95 and hydraulically connected to the inner shaft fluid way by a shaft nozzle supply port 99.

Similarly, the outer shaft fluid way has an outer annular space 101, which is formed between the interior surface 103 of the outer fluid shell 105 and the inner fluid shell outer surface 85, which is hydraulically connected to one or more nozzle fluid ways 27 in a nozzle arm 61 thereby providing for pressurized gas to be conveyed to the turbine nozzles 25.

Drive fluid from the first fluid supply line flows into the outer shaft fluid way from the first supply chamber through the annular outer fluid way intake 121. Similarly, drive fluid from the second fluid supply line flows into the inner shaft fluid way from the second supply chamber through the annular inner fluid way intake 123. Nozzle arms 107 with nozzle fluid ways supplied by the outer shaft fluid way are affixed to the outer fluid shell 105 and hydraulically connected to the inner shaft fluid way by a shaft nozzle supply port 99.

Referring again to FIG. 2, the outer housing 43 is a fixed shell which is preferably cylindrical in shape and concentric with the shaft 5. A front bearing 13 which bears on the outer shaft fluid way outer surface 87 and the outer housing inner surface 83 and a rear bearing 15 which bears on the shaft core outer surface 89 and the rear bearing bushing 111, provide for the free rotation of the shaft core, the concentric shaft gas ways which are affixed to the shaft core, and the turbine. A front seal 113 and a middle seal 115 minimize leakage of the drive fluid from the first supply chamber 79 and a rear seal 117 and the middle seal minimize leakage of the drive fluid from the second supply chamber 81 as the shaft rotates. A front seal collar 119 seals the inner shaft fluid way and the outer shaft fluid way and the assists in affixing the shaft fluid ways and the turbine to the shaft core.

While the embodiment shown in FIG. 2 provides for two pressurized drive fluid sources, the number of peripheral, concentric shaft fluid ways can be varied. Embodiments providing for the independent input of additional fluid sources merely require additional concentric shaft fluid ways and additional fluid supply chambers separated by a respective inner seal. Also, depending upon the length and other physical characteristics of the shaft, multiple shaft fluid way embodiments may require additional inner bearings. The modification of this embodiment to provide for varying the number of shaft fluid ways from one to three or more will be obvious to a person skilled in the art. This would require varying the number of seals to provide for isolating a supply chamber for each of the pressurized fluid sources. Further, although the embodiment of FIG. 2 shows only one pressurized fluid supply line for each fluid supply chamber, a plurality of pressurized fluid supply lines and a plurality of pressurized fluid sources can be connected to any or all of the fluid supply chambers.

Again, for the embodiment shown in FIG. 2, a second intake assembly 12 which mirrors the first intake assembly, provides for the feed of pressurized drive fluid 37 from the first fluid supply line 71 and the second fluid supply line 73 to the shaft fluid way at the same or approximately the same pressure as that fed by the first intake assembly. Again this eliminates or greatly reduces the net thrust on the shaft bearings for each intake assembly.

Figure 4:
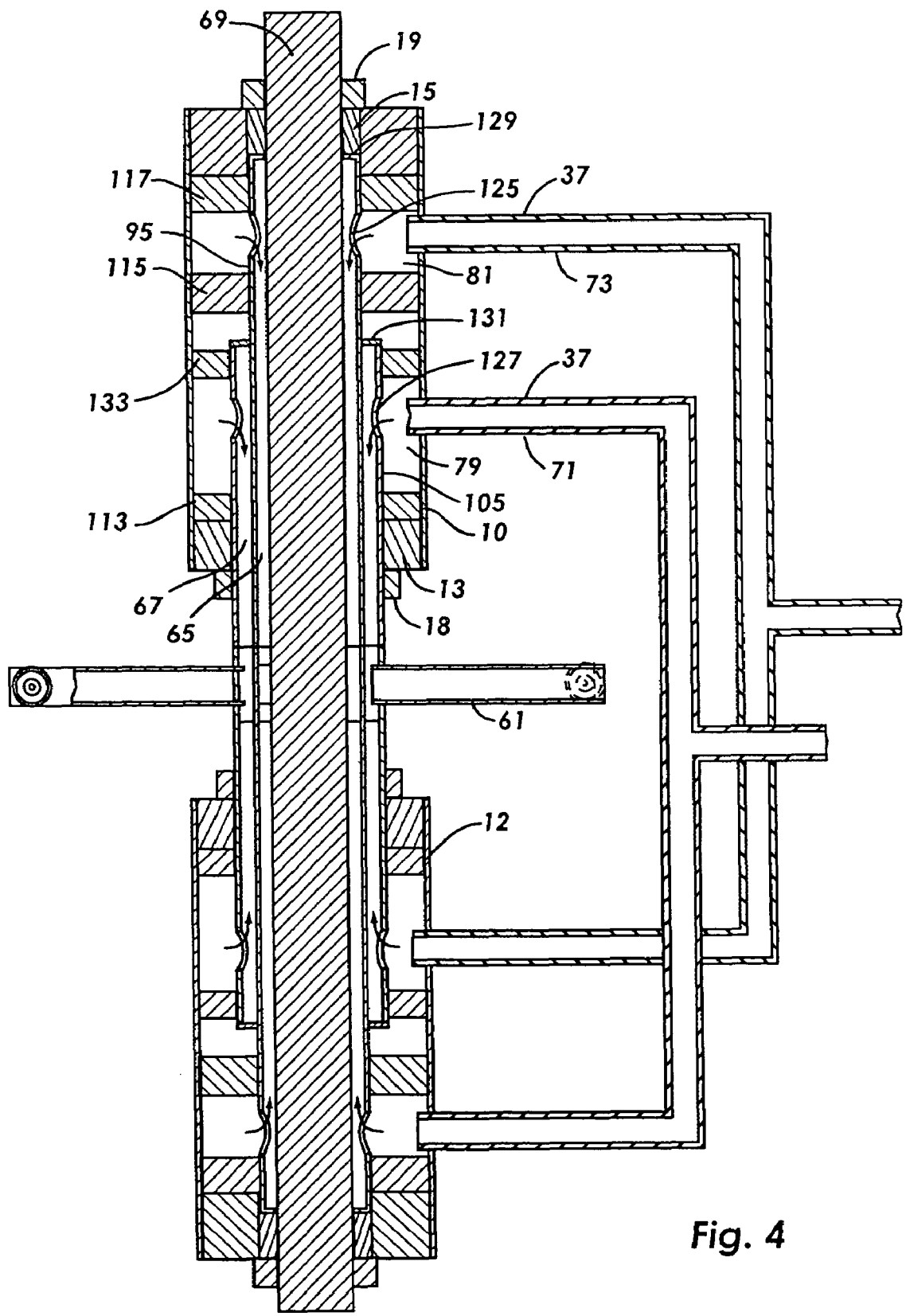
FIG. 4 is a horizontal cross section of a preferred embodiment of a bladeless turbine engine of the present invention with two peripheral, concentric, thrust reducing shaft fluid ways and opposing intake assemblies having two fluid supply chambers and two fluid supply lines.

Referring now to FIG. 4, a preferred embodiment of the turbine engine of the present invention is shown which is similar to the embodiment shown in FIG. 2. For this embodiment, however, pressurized fluid enters the inner shaft fluid way 65 by one or more inner fluid way ports 125 in the inner fluid shell 95. Similarly, pressurized fluid enters the outer shaft fluid way 67 by one or more outer fluid way ports 127 in the outer fluid shell 105. An inner shaft fluid way thrust plug 129 in the inner shaft fluid way and an outer shaft way thrust plug 131 in the outer shaft fluid way provide for a reduction in the net thrust imposed on the front bearing 13 and the rear bearing 15. This also requires a second middle seal 133 and a different positioning and sizing for the rear seal 117. As with the embodiments shown in FIG. 1 and FIG. 2, the second intake assembly 12 mirrors the first intake assembly 10, thereby further reducing or eliminating the net thrust imposed on the bearings for each intake assembly.

Although flash chambers are not included for the embodiments shown in FIG. 2 and FIG. 4 respectively, any or all of the flash chambers included for the embodiment shown in FIG. 1 can be incorporated for the embodiments shown in FIG. 2 and FIG. 4 as well as any similar embodiment utilizing one or more peripheral, concentric shaft gas ways.

Figure 5:
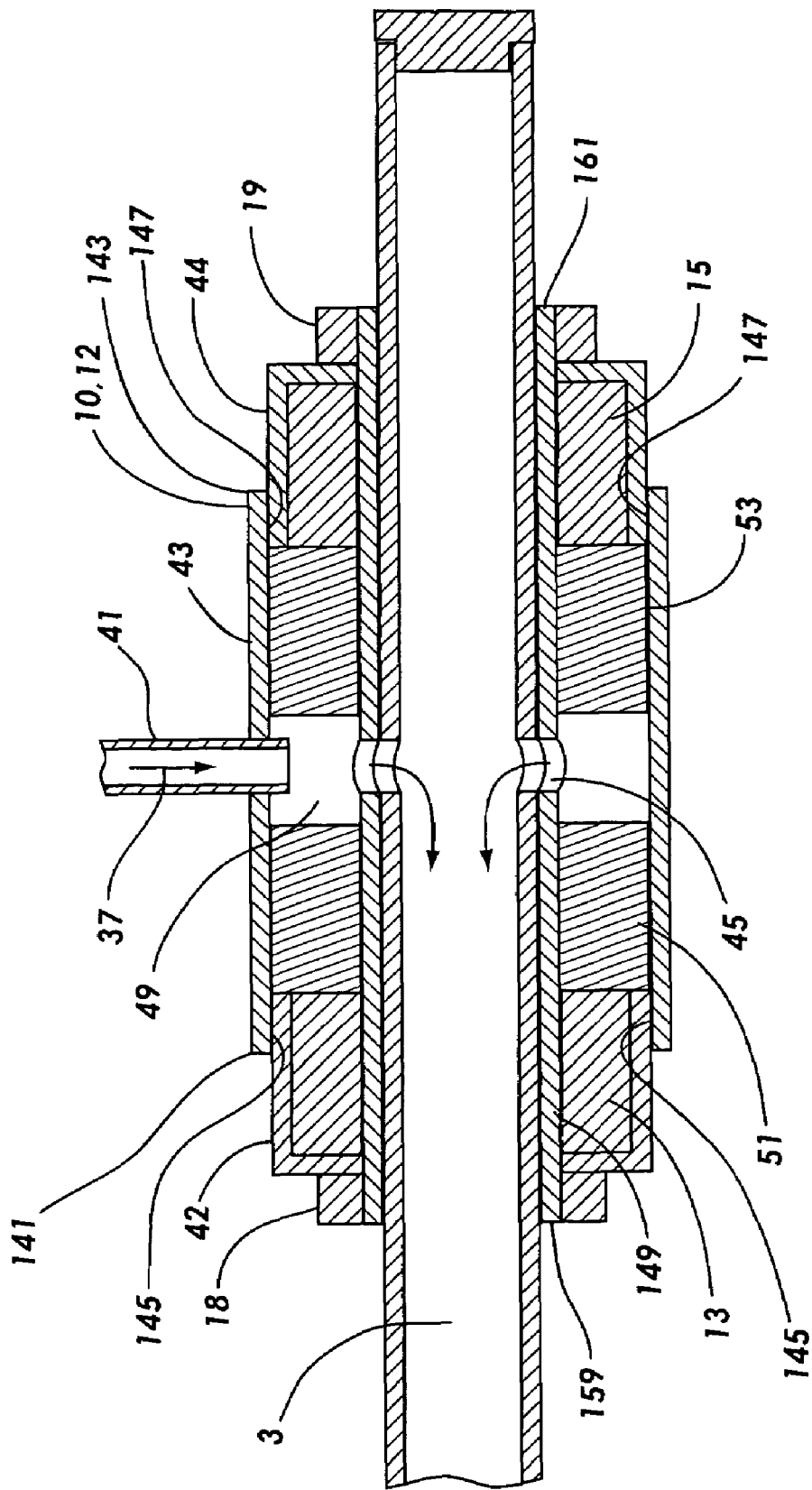
FIG. 5 is a horizontal cross section of a preferred embodiment of an intake assembly of the present invention for a turbine shaft with an internal shaft fluid way, the intake assembly having an outer housing, a front housing and a rear housing, and having one fluid supply chamber and one fluid supply line.

Referring now to FIG. 5, this embodiment of an intake assembly could be used for a first intake assembly 10 and an opposing second intake assembly 12 for a turbine shaft with one internal shaft fluid way 3 and incorporates a front housing 42 and a rear housing 44. The second intake assembly mirrors the first intake assembly. The front housing may have an exteriorly threaded rear end 145 which is secured to the outer housing by threading into an interiorly threaded front end of the outer housing 141. Similarly the rear housing may have an exteriorly threaded front end 147 which is secured to the outer housing by threading into an interiorly threaded rear end of the outer housing 143. This facilitates disassembly and reassembly of the intake assembly for maintenance and service of the shaft bearings 13, 15 and shaft seals 51, 53. Other means besides threading for connecting the outer housing and the front housing and rear housing respectively will be known to persons skilled in the art. Also, the front housing and the rear housing may be inserted on the exterior of the respective ends of the outer housing by threading or other means known in the art. This embodiment utilizes a shaft sleeve 149 which has an exteriorly threaded shaft sleeve front end 159 and an exteriorly threaded shaft sleeve rear end 161 to facilitate the use of a screw-on front thrust collar 18 and a screw-on thrust nut 19. Other means for positioning the intake assembly and the shaft bearings in particular and reducing the thrust imposed on the shaft bearings are known in the art.

Figure 6:
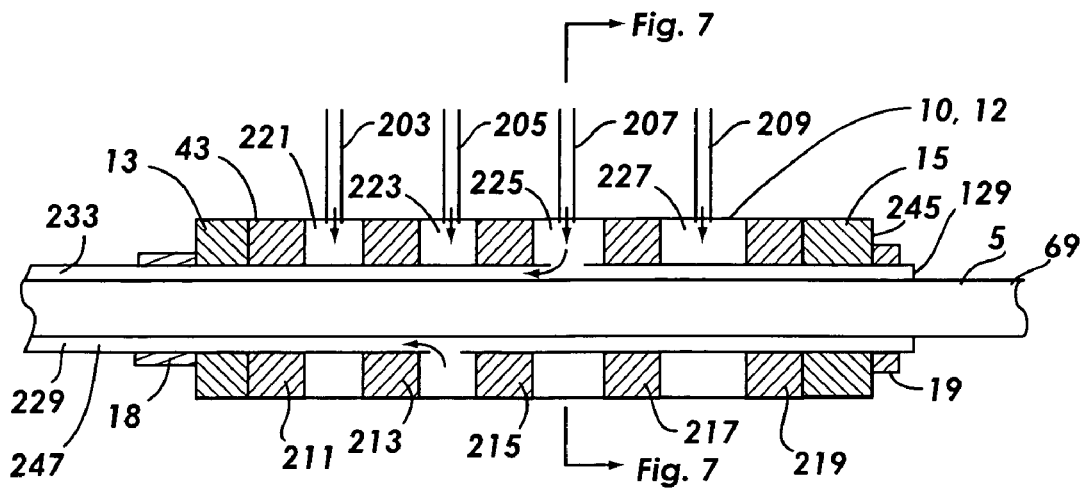
FIG. 6 is a horizontal cross section of a preferred embodiment of an intake assembly of the present invention for a turbine shaft having a four circumferential shaft fluid ways, four fluid supply chambers and four fluid supply lines.
Figure 7:
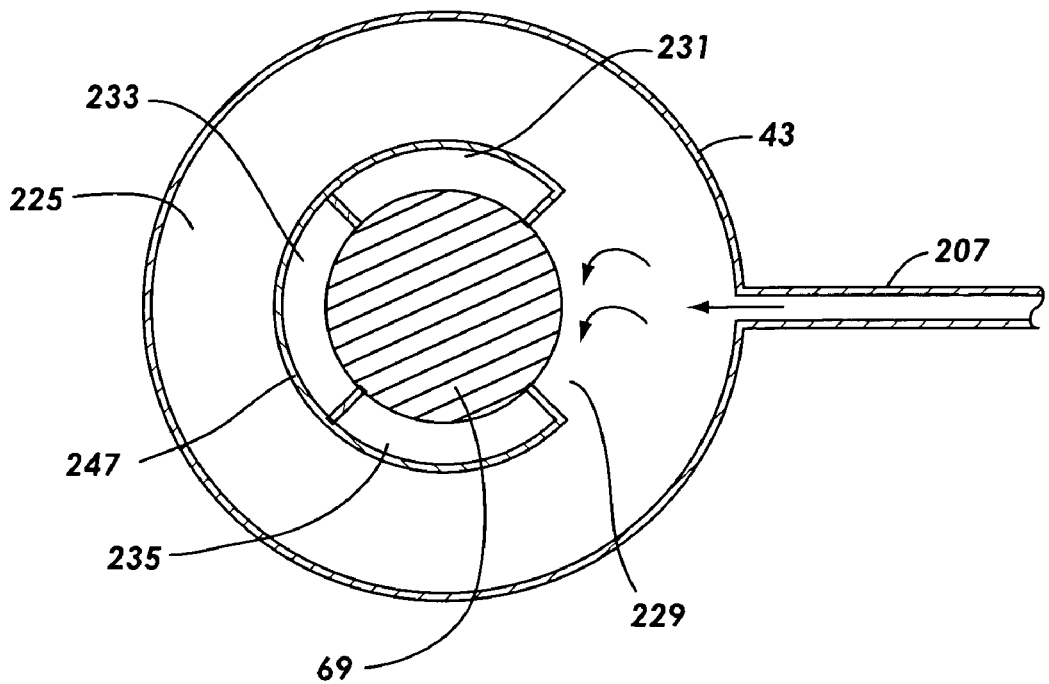
FIG. 7 is a vertical cross section of a preferred embodiment of an intake assembly of the present invention for a turbine shaft having four circumferential shaft fluid ways.
Figure 8:
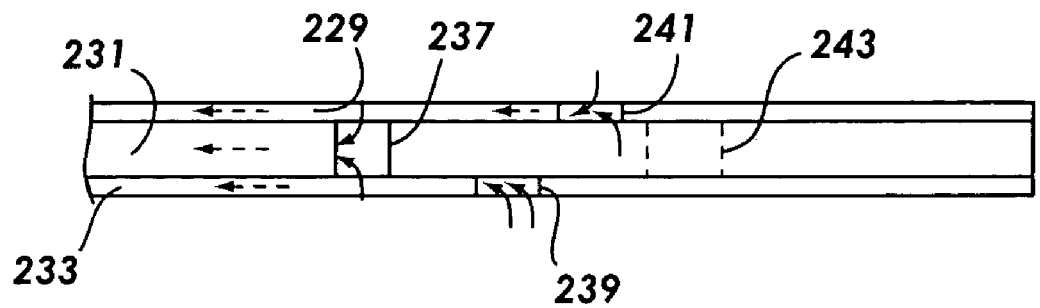
FIG. 8 is a horizontal top view of a turbine shaft of the present invention with four circumferential shaft fluid ways.
Figure 9:
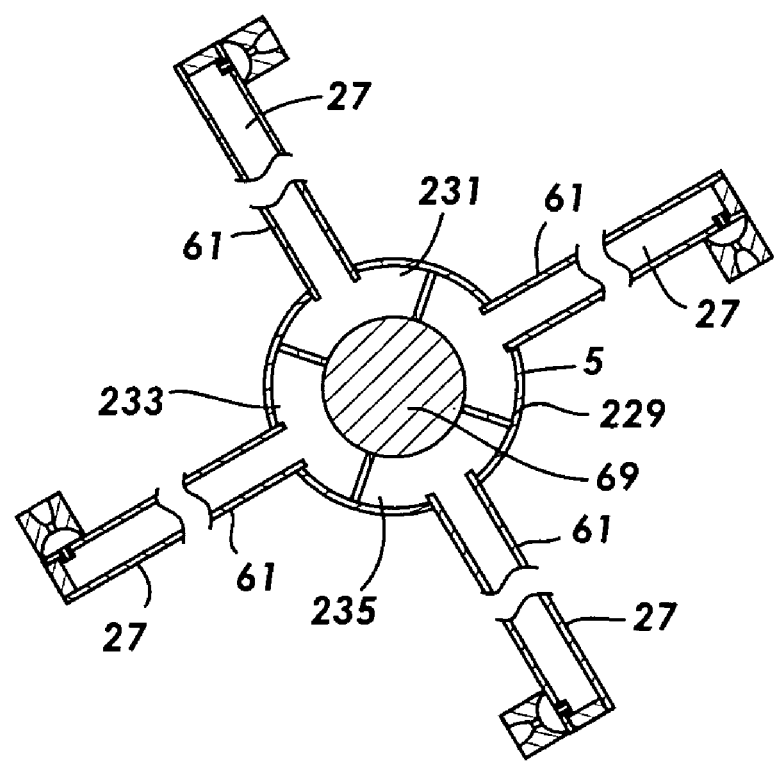
FIG. 9 is a vertical cross section of a preferred embodiment of a bladeless turbine engine of the present invention with four circumferential shaft fluid ways.

Referring now to FIG. 6, an alternative preferred embodiment of an intake assembly that could be used for a first intake assembly 10 and second intake assembly 12 of the present invention with peripheral shaft fluid ways is shown. For illustrative purposes, this embodiment is shown with four pressurized fluid supply lines 203, 205, 207, 209, but this embodiment could be used with any number of pressurized fluid supply lines. Referring also to FIG. 7 and FIG. 8, for this embodiment, the peripheral shaft fluid ways are contained in a circumferential conduit 247 which is divided into four contiguous, longitudinal, segmental shaft fluid ways 229, 231, 233, 235 which intake pressurized fluid from the respective pressurized fluid sources through fluid way intakes 237, 239, 241, 243 which are isolated in respective circumferential supply chambers 221, 223, 225, 227 by respective shaft seals 211, 213, 215, 217, 219. A front shaft bearing 13 and a rear shaft bearing 15 bear between the outer housing 43 and the circumferential conduit providing for the free rotation of the shaft in the outer housing. The circumferential conduit and the peripheral shaft fluid ways inclosed in the circumferential conduit extend rearward from the rear shaft bearing and the outer housing rear wall 245. Thrust plugs 129 in each of the shaft fluid ways provide for reducing the thrust imposed on the bearings. A thrust nut 19 provides for positioning and pre-loading the bearings of the intake assembly. Referring to FIG. 9, each of the shaft fluid ways is connected to one or more nozzle fluid ways 27. Alternatively, opposing shaft fluid ways can have pressurized fluid supplied from the same source with the fluid way intakes for opposing shaft fluid ways being isolated in the same supply chamber.

Variations of the embodiments of the first intake assembly 10 and second intake assembly 12 shown in FIG. 1 and FIG. 6 may incorporate an outer housing which is divided longitudinally into two or more concentric outer housing segments to allow for ease of access to the seals and bearings for maintenance and replacement. These segments can be joined by respective exterior and interior threading of adjacent segments in the manner shown on FIG. 5 for joining between the outer housing and the front housing and the rear housing. Other means for joining concentric outer housing segments are known in the art.

Figure 10:
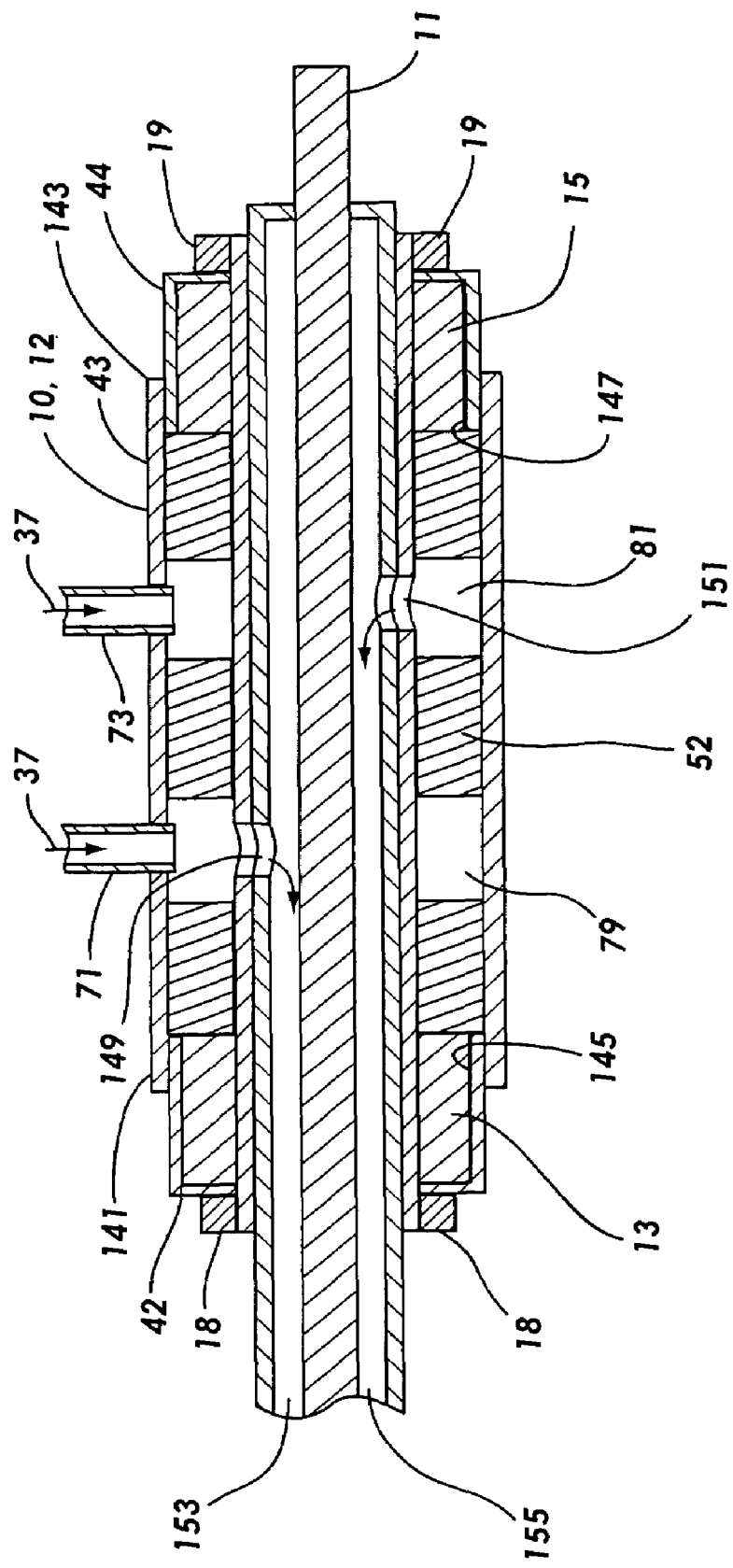
FIG. 10 is a horizontal cross section of a preferred embodiment of an intake assembly of the present invention for a turbine shaft with two circumferential shaft fluid ways, the intake assembly having an outer housing, a front housing and a rear housing, and having two fluid supply chambers and two fluid supply lines.

Referring now to FIG. 10, this embodiment of a pressurized fluid intake assembly that can be used for a first intake assembly 10 and a second intake assembly 12 is a two fluid source embodiment with an outer housing 43, front housing 42, and rear housing 44 arrangement similar to that shown in FIG. 5, with the front housing and the rear housing threaded into the outer housing. This embodiment, however, incorporates two circumferential shaft gas ways, a first circumferential shaft gas way 153 and a second circumferential shaft gas way 155, in the manner shown in FIGS. 6-9 for a four fluid source embodiment. A middle shaft seal 52 provides for hydraulic isolation of the front supply chamber 79 and the rear supply chamber 81 which are hydraulically connected to the first shaft fluid intake 149 and the second shaft fluid intake 151 respectively. The embodiment shown in FIG. 10 can be readily adapted for more than two fluid sources. This merely requires the addition of additional shaft seals to separate the respective supply chambers.

For the embodiments shown in FIG. 1, FIG. 2, FIG. 4, FIG. 6 and FIG. 10 and variations thereof, a support structure for the turbine engine can be affixed to the outer housing of the first intake assembly and the outer housing of the second intake assembly. The entire turbine engine of these embodiments can be enclosed in a turbine engine body for fluid capture and recycle and for waste heat capture and recycle. Alternatively, the turbine can be enclosed in a turbine engine body with the turbine shaft extending through one wall or two opposing walls of the turbine engine body, thereby allowing for fluid and waste heat capture and recycle. Enclosures for enclosing the turbine engine or the turbine for fluid and waste heat capture and recycle will be known to persons skilled in the art.

While the embodiments of the first intake assembly 10 and the second intake assembly 12 shown in the figures and described above are particularly adaptable for use for a turbine engine utilizing the embodiments of the bladeless turbine 23 shown in the figures and described above, the embodiments of the first intake assembly and the second intake assembly of the present invention are also readily adaptable for use with bladeless turbines known in the art which utilize shaft fluid ways to supply pressurized fluid to the turbine.

Figure 12:
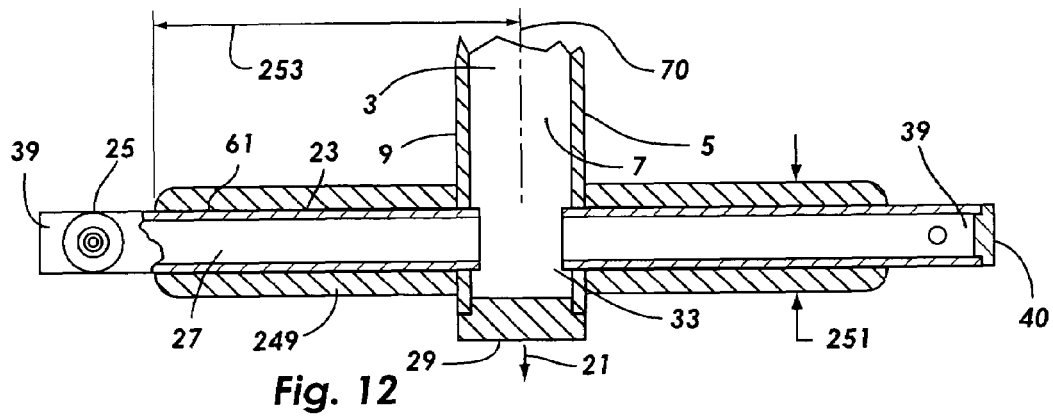
FIG. 12 is a horizontal cross section of a preferred embodiment of a bladeless turbine of the present invention with a nozzle arm shield.
Figure 11:
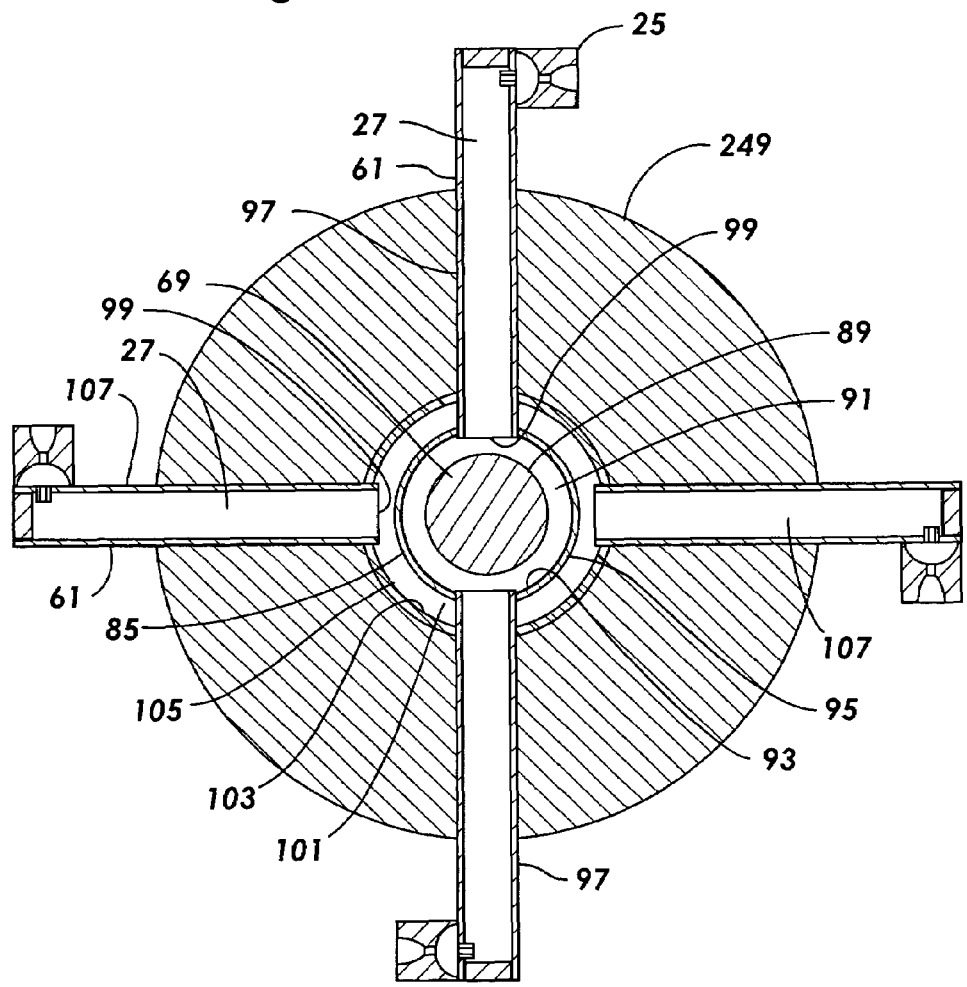
FIG. 11 is a vertical cross section of a preferred embodiment of a bladeless turbine engine of the present invention with two peripheral, concentric shaft fluid ways and a nozzle arm shield.

Referring now to FIG. 11 and FIG. 12, it will be noted that the various embodiments of the turbine engine and the various embodiments of the first intake assembly and the second intake assembly of the present invention shown in the drawings and described above are compatible with the incorporation of a nozzle arm shield 249 which, for the embodiment shown, is a streamlined disc with a uniform disc thickness 251 and a uniform disc radius 253. FIG. 11 is front view vertical cross section showing the use of a nozzle arm shield with an embodiment of the turbine engine having two peripheral, concentric shaft fluid ways such as that shown in FIG. 4. FIG. 12 is a top view horizontal cross section showing the use of a nozzle arm shield with an embodiment of the turbine engine having an internal shaft fluid way. The nozzle arm shield reduces the air resistance experienced by the nozzle arms as the turbine arms rotate. The nozzle arm shield can also be used to structurally support the nozzle arms and reduce the deformation of the nozzle arms as the nozzle arms rotate. The nozzle arm shield can be split radially for ease of assembly and disassembly and can assembled with bolts, welding or other means known in the art. Other embodiments of the nozzle arm shield which provide for reduction in the air resistance experienced by the nozzle arm or increase the structural stability of the nozzle arms or both will be obvious to persons skilled in the art.

It should be noted that each of the embodiments of the present invention can be used for compressible and non-compressible fluids, including, for example, pressurized hot water and pressurized steam.

Other embodiments of the invention and other variations and modifications of the embodiments described above will be obvious to a person skilled in the art. Therefore, the foregoing is intended to be merely illustrative of the invention and the invention is limited only by the following claims and the doctrine of equivalents.

What is claimed is:

1. Pressurized fluid turbine engine comprising:
    a) bladeless turbine having a plurality of fluid nozzles and one or more nozzle fluid ways;
    b) turbine shaft with an internal or a peripheral, concentric shaft fluid way, the shaft fluid way having two or more shaft fluid intakes, the turbine being affixed to the turbine shaft, each fluid nozzle being hydraulically connected to the shaft fluid way by one or more nozzle fluid ways;
    c) pair of opposing intake assemblies, a first intake assembly and a second intake assembly, the respective intake assemblies being located on opposing sides of the bladeless turbine, each intake assembly having a fixed outer housing, each intake assembly having a pair of shaft seals, a front shaft seal and a rear shaft seal, each shaft seal sealing between the turbine shaft and the outer housing, a fluid supply chamber being created between the shaft seals, the outer housing having one or more fluid intake ports to the fluid supply chamber, the fluid supply chamber being hydraulically connected to each shaft fluid intake, and each intake assembly having two or more shaft bearings bearing between the outer housing and the turbine shaft.

2. Pressurized fluid turbine engine as recited in claim 1 wherein the outer housing comprises a concentric shell.

3. Pressurized fluid turbine engine as recited in claim 1 further comprising one or more flash chambers.

4. Pressurized fluid turbine engine as recited in claim 1 further comprising an intake flash chamber, a shaft flash chamber, and a nozzle flash chamber.

5. Pressurized fluid turbine engine as recited in claim 1 further comprising a turbine engine body enclosing the turbine in a turbine chamber, the turbine engine body having an expansion chamber and a shaftway passing the turbine shaft.

6. Pressurized fluid turbine engine as recited in claim 1 wherein each of the nozzles further comprises a fluid exit cone.

7. Pressurized fluid turbine engine as recited in claim 1 wherein each of the fluid nozzles is affixed to the perimeter of the turbine and hydraulically connected to one or more nozzle fluid ways by a nozzle support tube.

8. Pressurized fluid turbine engine as recited in claim 1 wherein each shaft fluid way further comprises a pair of opposing thrust plugs.

9. Pressurized fluid turbine engine recited in claim 1 further comprising a turbine engine body enclosing the turbine in a turbine chamber, the turbine engine body having an expansion chamber, the turbine engine body having a front wall and a rear wall, and the front wall and the rear wall having a shaftway passing the turbine shaft.

10. Pressurized fluid turbine engine comprising:
   a) bladeless turbine having a plurality of fluid nozzles and one or more nozzle fluid ways;
   b) turbine shaft with two or more peripheral shaft fluid ways, each shaft fluid way having two or more shaft fluid intakes, the turbine being affixed to the turbine shaft, each fluid nozzle being hydraulically connected to one or more shaft fluid ways by one or more nozzle fluid ways;
   c) pair of opposing intake assemblies, a first intake assembly and a second intake assembly, the respective intake assemblies being located on opposing sides of the bladeless turbine, each intake assembly having a fixed outer housing, each intake assembly having three or more shaft seals, each shaft seal sealing between the turbine shaft and the outer housing, respective fluid supply chambers being created between adjacent shaft seals, the outer housing having one or more fluid intake ports to each fluid supply chamber, each fluid supply chamber being hydraulically connected to one or more shaft fluid intakes, and each intake assembly having two or more shaft bearings bearing between the outer housing and the turbine shaft.

11. Pressurized fluid turbine engine as recited in claim 10 wherein the peripheral shaft fluid ways are concentric shaft fluid ways.

12. Pressurized fluid turbine engine as recited in claim 10 wherein the peripheral shaft fluid ways are longitudinal, segmental circumferential shaft fluid ways.

13. Pressurized fluid turbine engine as recited in claim 10 wherein the outer housing comprises a concentric shell.

14. Pressurized fluid turbine engine as recited in claim 10 further comprising one or more flash chambers.

15. Pressurized fluid turbine engine as recited in claim 10 further comprising an intake flash chamber, a shaft flash chamber, and a nozzle flash chamber.

16. Pressurized fluid turbine engine recited in claim 10 further comprising a turbine engine body enclosing the turbine in a turbine chamber, the turbine engine body having an expansion chamber and a shaftway passing the turbine shaft.

17. Pressurized fluid turbine engine as recited in claim 10 wherein each of the nozzles further comprises a fluid exit cone.

18. Pressurized fluid turbine engine as recited in claim 10 wherein each of the fluid nozzles is affixed to the perimeter of the turbine and hydraulically connected to one or more nozzle fluid ways by a nozzle support tube.

19. Pressurized fluid turbine engine as recited in claim 10 wherein each shaft fluid way further comprises a pair of opposing thrust plugs.

20. Pressurized fluid turbine engine recited in claim 10 further comprising a turbine engine body enclosing the turbine in a turbine chamber, the turbine engine body having an expansion chamber, the turbine engine body having a front wall and a rear wall, and the front wall and the rear wall having a shaftway passing the turbine shaft.

21. Apparatus for supplying pressurized fluid to a bladeless turbine comprising a pair of opposing intake assemblies, a first intake assembly and a second intake assembly, the respective intake assemblies being located on opposing sides of the bladeless turbine, each intake assembly comprising:
   a) turbine shaft with an internal or a peripheral, concentric shaft fluid way, the shaft fluid way having one or more shaft fluid intakes;
   c) fixed outer housing;
   d) pair of opposing shaft seals, a front shaft seal and a rear shaft seal, each shaft seal sealing between the turbine shaft and the outer housing, a fluid supply chamber being created between the shaft seals, the outer housing having one or more fluid intake ports to the fluid supply chamber, the fluid supply chamber being hydraulically connected to each shaft fluid intake; and
   e) two or more shaft bearings bearing between the outer housing and the turbine shaft.

22. Apparatus as recited in claim 21 wherein the outer housing comprises a concentric shell.

23. Apparatus as recited in claim 21 further comprising one or more flash chambers.

24. Apparatus as recited in claim 21 further comprising an intake flash chamber and a shaft flash chamber.

25. Apparatus as recited in claim 21 wherein each shaft fluid way further comprises a pair of thrust plugs.

26. Apparatus for supplying pressurized fluid to a bladeless turbine comprising a pair of opposing intake assemblies, a first intake assembly and a second intake assembly, the respective intake assemblies being located on opposing sides of the bladeless turbine, each intake assembly comprising:
   a) turbine shaft with two or more peripheral shaft fluid ways, each shaft fluid way having one or more shaft fluid intakes;
   b) fixed outer housing;
   c) three or more shaft seals, each shaft seal sealing between the turbine shaft and the outer housing, respective fluid supply chambers being created between adjacent shaft seals, the outer housing having one or more fluid intake ports to each fluid supply chamber, each fluid supply chamber being hydraulically connected to one or more shaft fluid intakes; and
   d) two or more shaft bearings bearing between the outer housing and the turbine shaft.

27. Apparatus as recited in claim 26 wherein the peripheral shaft fluid ways are concentric shaft fluid ways.

28. Apparatus as recited in claim 26 wherein the peripheral shaft fluid ways are longitudinal, segmental circumferential shaft fluid ways.

29. Apparatus as recited in claim 26 wherein the outer housing comprises a concentric shell.

30. Apparatus as recited in claim 26 further comprising one or more flash chambers.

31. Apparatus as recited in claim 26 further comprising an intake flash chamber and a shaft flash chamber.

32. Apparatus as recited in claim 26 further comprising a turbine engine body enclosing the turbine in a turbine chamber, the turbine engine body having an expansion chamber and a shaftway passing the turbine shaft.

33. Apparatus as recited in claim 26 wherein each of the fluid nozzles is affixed to the perimeter of the turbine and hydraulically connected to one or more nozzle fluid ways by a nozzle support tube.

34. Apparatus as recited in claim 26 wherein each shaft fluid way further comprises a pair of opposing thrust plugs.

35. Apparatus for supplying pressurized fluid to a bladeless turbine comprising a pair of opposing intake assemblies, a first intake assembly and a second intake assembly, the respective intake assemblies being located on opposing sides of the bladeless turbine, each intake assembly comprising:
- a) turbine shaft having a shaft core and one or more peripheral shaft fluid ways affixed to the shaft core, each shaft fluid way having one or more shaft fluid intakes, the turbine shaft having an exterior surface;
- b) fixed outer housing;
- c) two or more shaft seals, each shaft seal sealing between the turbine shaft and the outer housing, respective fluid supply chambers being created between adjacent shaft seals, the outer housing having one or more fluid intake ports to each fluid supply chamber, each fluid supply chamber being hydraulically connected to one or more shaft fluid intakes; and
- d) two or more shaft bearings bearing between the outer housing and the turbine shaft.

36. Apparatus as recited in claim 35 wherein the peripheral shaft fluid ways are concentric shaft fluid ways.

37. Apparatus as recited in claim 35 wherein the peripheral shaft fluid ways are longitudinal, segmental circumferential shaft fluid ways.

38. Apparatus as recited in claim 35 wherein the outer housing comprises a concentric shell.

39. Apparatus as recited in claim 35 further comprising one or more flash chambers.

40. Apparatus as recited in claim 35 further comprising an intake flash chamber and a shaft flash chamber.

41. Apparatus as recited in claim 35 further comprising a turbine engine body enclosing the turbine in a turbine chamber, the turbine engine body having an expansion chamber and a shaftway passing the turbine shaft.

42. Apparatus as recited in claim 35 wherein each shaft fluid way further comprises a pair of opposing thrust plugs.

43. Apparatus for supplying pressurized fluid to a bladeless turbine comprising a pair of opposing intake assemblies, a first intake assembly and a second intake assembly, the respective intake assemblies being located on opposing sides of the bladeless turbine, each intake assembly comprising:
- a) turbine shaft having a shaft core and a circumferential fluid conduit affixed to the shaft core, the circumferential fluid conduit having a concentric exterior surface and one or more longitudinal, segmental shaft fluid ways, each shaft fluid way having one or more shaft fluid intakes;
- b) fixed outer housing;
- c) two or more shaft seals sealing between the outer housing and the concentric exterior surface of the circumferential conduit, respective fluid supply chambers being created between adjacent shaft seals, the outer housing having one or more fluid intake ports to each fluid supply chamber, each fluid supply chamber being hydraulically connected to one or more shaft fluid intakes;
- d) two or more shaft bearings bearing between the outer housing and the turbine shaft.

44. Bladeless turbine pressurized fluid intake assembly as recited in claim 43 wherein the outer housing comprises a concentric shell.

45. Bladeless turbine pressurized fluid intake assembly as recited in claim 43 further comprising one or more flash chambers.

46. Bladeless turbine pressurized fluid intake assembly as recited in claim 43 further comprising an intake flash chamber and a shaft flash chamber.

47. Bladeless turbine pressurized fluid intake assembly as recited in claim 43 further comprising a turbine engine body enclosing the turbine in a turbine chamber, the turbine engine body having an expansion chamber and a shaftway passing the turbine shaft.

48. Bladeless turbine pressurized fluid intake assembly as recited in claim 46 wherein each shaft fluid way further comprises a pair of opposing thrust plugs.

* * * * *